United States Patent [19]
Holt, Jr.

[11] Patent Number: 5,743,216
[45] Date of Patent: Apr. 28, 1998

[54] COMBINED SMALL ANIMAL HARNESS AND LEAD

[75] Inventor: Robert C. Holt, Jr., North Canton, Ohio

[73] Assignee: Coastal Pet Products, Inc., Alliance, Ohio

[21] Appl. No.: 588,387

[22] Filed: Jan. 18, 1996

[51] Int. Cl.[6] ................................................ A01K 27/00
[52] U.S. Cl. ...................................... 119/793; 119/863
[58] Field of Search ................................. 119/792, 793, 119/770, 856, 907, 863; 24/115 G, 115 H

[56] References Cited

PUBLICATIONS

Classic Products advertisement, 2 pages, 1992.
EA Young Co., Ltd. advertisement, 3 pages, undated.
Four Paws Products, Ltd. advertisement, 5 pages, undated.
R.D. Symonds Co. advertisement "Handy Harness", 2 pages, undated.
Hamilton Products advertisement, 2 pages, undated.
Hamilton Products advertisement "Deluxe Ferret Harness", 1 page, 1996.
Marshall Pet Products advertisement, *Pet age Boutique Magique*, 2 pages, Oct. 1995.
Premier Pet Products, Inc. advertisement, 2 pages, Mar. 1994.
Pronix Industries Inc. advertisement, 2 pages, undated.
Rolf C. Hagen (U.S.A.) Cor. advertisement, 4 pages, undated.
T-Rex (Trade Name of Ocean Nutrition Corporation) advertisement, 3 pages, undated.
Vo-Toys, Incorporated advertisement, 2 pages, undated.

*Primary Examiner*—Gene Mancene
*Assistant Examiner*—Yvonne R. Abbott
*Attorney, Agent, or Firm*—Renner, Kenner, Greive, Bobak, Taylor & Weber

[57] ABSTRACT

A combined harness and lead (10) for use in restraining and controlling an animal has a cord member (11) which defines a lead portion (12) and a harness portion (14). The harness portion (14) includes a neck loop (35) and a body loop (36) which may be selectively adjusted by way of an adjustment slide (15). A floating retaining slide (16) further defines the neck loop (35) and body loop (36). The adjustment slide (15) clampingly engages the cord member (11) so as to maintain said harness portion (14) in position on the animal's body.

13 Claims, 3 Drawing Sheets

COMBINED SMALL ANIMAL HARNESS AND LEAD

TECHNICAL FIELD

This invention relates to animal harnesses and leads, for example of the type used for restraining domestic pets. More particularly, this invention relates to a combined animal harness and lead particularly suitable for small animals including, but not limited to cats, rabbits, guinea pigs, ferrets and iguanas. Specifically, the invention relates to such a combined harness and lead which is self-adjusting and non-restrictive, in that it will not slip and allow the neck or girth to become excessively tight.

BACKGROUND ART

For many years it has been known to use harnesses and leads on domestic pets, such as dogs, for the purpose of restraining or controlling the animal. More recently, it has been known to use similar harnesses for smaller animals such as rabbits, ferrets, guinea pigs, and iguanas. Such previously known harnesses have included a variety of designs ranging from simple neck collars to more elaborate configurations having a plurality of loops and/or fitted vest-like straps.

A primary disadvantage of designs employing simple neck collars or loops is the inability of the device to remain properly fitted to the animal, particularly when the animal is struggling against the harness or lead. Frequently the animal will become entangled in the harness or the harness will simply loosen to the point where the animal can easily free itself. It has also been known for the harness to tighten at the neck and/or girth in response to pulling or struggling on the part of the animal. This tightening is extremely undesirable in that it is at best uncomfortable for the animal and at worst dangerous.

While more elaborate designs have overcome some of the drawbacks of the simpler designs, such have presented new drawbacks relating to adjustability and/or ease of use. Particularly, these designs are frequently quite difficult to fit properly on the animal due to the numerous loops and/or slides which must be adjusted. Those designs having simplified adjustment typically lack the versatility of being capable of fitting animals of different shapes and sizes.

Accordingly, it is desirable to obtain a combined harness and lead for small animals which is easy to use and adaptable for use with animals of various shapes and sizes while being safe and secure in restraining the animal.

DISCLOSURE OF THE INVENTION

It is thus a primary object of the invention to provide a combined harness and lead for restraining small animals such as cats, guinea pigs, ferrets, rabbits and iguanas.

It is another object of the present invention to provide a combined harness and lead, as above, which is effective to restrain the animal both securely and safely.

It is a further object of the present invention to provide a combined harness and lead, as above, which is self-adjusting and adaptable for use with animals of different shapes or sizes.

It is yet another object of the present invention to provide a combined harness and lead, as above, which is non-restrictive in that it will not slip and allow the neck or girth to become excessively tight.

It is still a further object of the present invention to provide a combined harness and lead, as above, which is both easy to use and easy to manufacture using known techniques and materials.

These and other objects of the present invention, which will become apparent from the description to follow, are accomplished by the improvements hereinafter described and claimed.

In general, an animal restraint and control device includes a harness member adapted to fit on the body of an animal and a lead combined with the harness member for controlling and restraining the animal. An adjustment device associated with the harness member enables the harness member to be quickly and securely adjusted around the animal's body.

More specifically, a combined harness and lead for controlling and restraining an animal includes a cord member defining a harness portion and a lead portion. The harness portion includes a neck loop and a body loop and the lead portion includes a hand loop. An adjustment slide engages the cord member between the neck loop and the body loop and includes means for receiving the cord member. The means for receiving has means for selectively clamping the cord member therein and includes a pair of opposed mating protrusions each having an aperture therein and means for biasing the protrusions away from one another such that the apertures may be concentrically aligned when a force is exerted on the adjustment slide sufficient to overcome the means for biasing. The cord member passes through the apertures and is selectively clampingly engaged therein. The size of the neck loop and the body loop is thus selectively adjustable by moving the cord member relative to the adjustment slide. The harness portion further includes a floating retaining slide between the neck loop and the body loop.

A preferred exemplary device incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
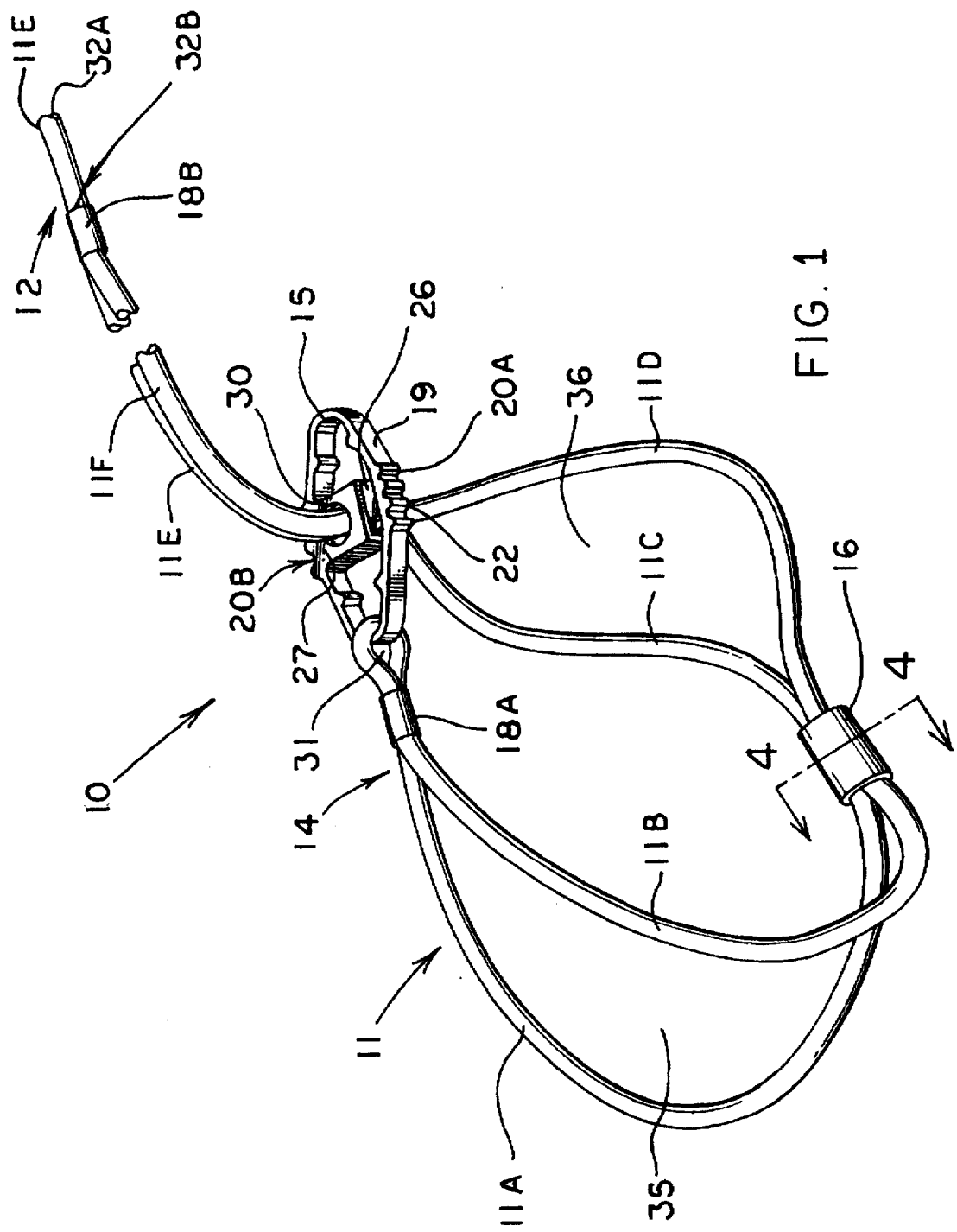
FIG. 1 is a perspective view of the combined harness and lead according to the concepts of the invention.

A combined animal harness and lead, generally indicated by the numeral 10 in the drawings, includes a length of cord 11 which generally defines a lead portion generally indicated by the numeral 12 and a harness portion generally indicated by the numeral 14. As is perhaps best shown in FIG. 1, lead portion 12 and harness portion 14 further include an adjustment slide 15, a retaining slide 18A, 18B and 18C, and a plurality of crimp clasps 18. While it is contemplated that cord member 11 might well be in the form of a cord having a generally circular cross-section as shown, and be manufactured from a nylon or other appropriate material, it is also contemplated that the member 11 might be in the form of braided nylon rope, nylon webbing or any number of other appropriate styles and/or materials. Thus, the term cord as used herein is used for convenience to refer to any such member, and should not be construed so as to limit the invention to the specific design shown.

Figure 2:
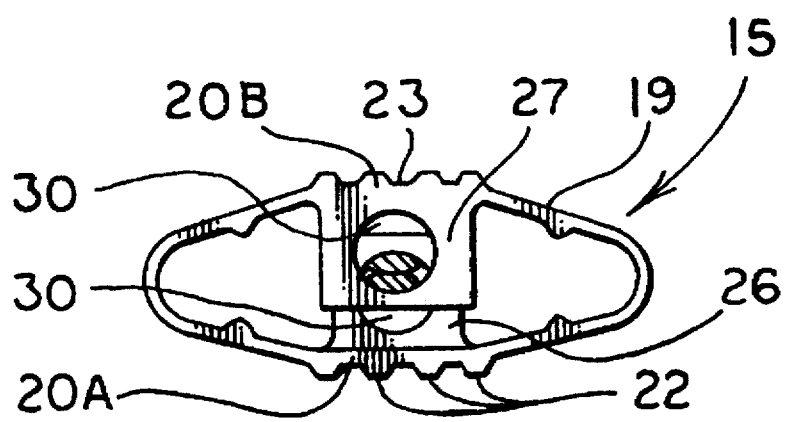
FIG. 2 is an enlarged plan view of the adjustment slide according to the invention, in an unactuated state.
Figure 3:
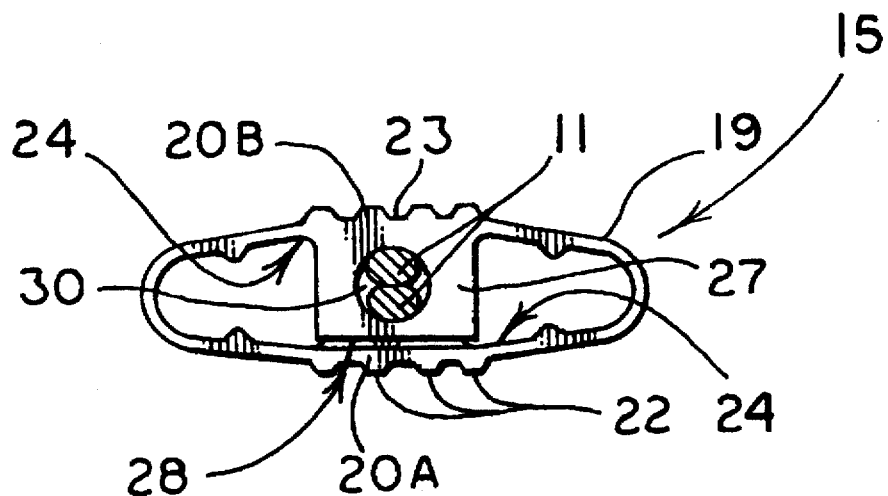
FIG. 3 is a view similar to FIG. 2, but depicting the adjustment slide in engagement with the harness cord.

With reference to FIGS. 2 and 3, adjustment slide 15 has a continuous wall portion 19, preferably formed from a resilient plastic or other suitable material into a generally elongated hexagonal shape. Opposing sides 20A and 20B of wall 19 are oriented generally parallel to one another, and for reasons which will become apparent, include a plurality of fluted ridges 22 on the outer surface 23 thereof.

On the inner surfaces 24 of opposed sides 20A and 20B are an opposed pair of mating protrusions 26 and 27. Specifically, a male protrusion 26 extends inwardly from side 20A, while a female protrusion 27 extends inwardly from side 20B. Female protrusion 27 includes a recess 28 adapted to receive male protrusion 26. Accordingly, recess 28 is of a slightly larger dimension than male protrusion 26. Both protrusions 26 and 27 include a generally circular aperture 30 therein. As shown male protrusion 26 is slidingly disposed within recess 28 such that when compressive force is exerted on adjustment slide 15 at sides 20A and 20B, wall 19 will flex so as to translate male protrusion 26 slidingly within recess 28 of female protrusion 27. At the point where adjustment slide 15 is substantially fully compressed, apertures 30 become concentrically aligned as shown in FIG. 3. Conversely when compressive force on adjustment slide 15 is relieved, sides 20A and 20B flex outwardly away from one another so as to cause male protrusion 26 to translate with respect to female protrusion 27 back to the locking state depicted in FIG. 2, wherein apertures 30 are no longer concentrically aligned. It should now be apparent that fluted ridges 22 are provided on adjustment slide 15 so as to aid in gripping and conmpressing wall 19 of slide 15. While device 10 has been described herein with reference to the particular structure of adjustment slide 15 it is contemplated that adjustment slide 15 may be in the form of any number of commercially available material locks such as use a spring bias pressure to maintain the material in place.

Figure 4:
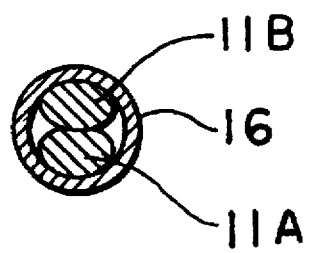
FIG. 4 is an enlarged cross-sectional view of the device taken along the line 4—4 of FIG. 1.

The novel harness and lead combination 10 is assembled as shown in FIG. 1. While it will be recognized that a number of different approaches to assembling the device are possible, the approach described herein has been employed for clarity. In such an approach, one end of continuous cord 11 is threaded through one end of adjustment slide 15 and cord 11 is doubled-back on itself before being secured with crimp clasp 18A. It should be recognized that means other than crimp clasps 18A, 18B and 18C may be utilized to secure cord 11 to itself. Such means could include stitching, tacking, heat sealing, or any other appropriate means. With crimp clasp 18A secured to cord 11, an eyelet 31 is formed in cord 11 at the junction with adjustment slide 15. The ends 32A and 32B of cord 11 are next threaded through retaining slide 16 as shown in FIG. 4. Cord portions 11A and 11B are thus formed between slide 15 and slide 16. Ends 32A and 32B are then threaded through apertures 30 of adjustment slide 15. This is accomplished by compressing wall 19 of slide 15 at sides 20A and 20B such that protrusions 26 and 27 are slidingly engaged and apertures 30 are concentrically aligned. With apertures 30 in concentric alignment, threading of cord 11 is facilitated. Cord portions 11C and 11D are accordingly formed between slide 16 and slide 15. Lead portion 12 is formed in one of two ways. In one way, cord 11 is doubled-back upon itself after being threaded through slide 15 as previously described, but is adjusted such that cord portion extends substantially further than cord portion 11F. Thus, when end 32B is secured to cord 11 with crimp clasp 18B the cord portion 11E which extends beyond clasp 18B defines lead portion 12. Alternatively, it is contemplated that both ends 32A and 32B might be terminated at a swivel (not shown), at the junction of harness portion 14 and lead portion 12 adjacent to crimp clasp 18B while a separate length of cord also engages the swivel, thereby forming lead portion 12. Those skilled in the art will recognize that the swivel may be desirable to prevent twisting or tangling of the device 10. In either scenario it is desirable to again double-back cord 11 of lead portion 12 and secure it to itself using crimp clasp 18C, as shown in FIG. 5, so as to form a hand loop 34.

With cord 11 threaded and secured as described above, the combined harness and lead 10 is assembled and ready to be fitted to an animal. As is perhaps best shown in FIG. 1, harness portion 14 is formed so as to have of a neck loop 35 and a body loop 36. Neck loop 35 is defined by cord portions 11A and 11B between clasp 18A and retaining slide 16, while body loop 36 is defined by cord portions 11C and 11D between retaining slide 16 and adjustment slide 15. Those skilled in the art will recognize that the size of either loop 35 or 36 is directly dependent on the position of slides 15 and 16 with respect to cord 11. Accordingly, the fit of combined harness and lead 10 may be adjusted by selective positioning of slides 15 and 16 relative to cord 11. While it is possible to manually position retaining slide 16 so as to adjust the size of loops 35 and 36, it should be recognized that slide 16 is substantially self-positioning in that it will float in response to a widening of the, loops while the harness is being fitted on an animal.

Figure 5:
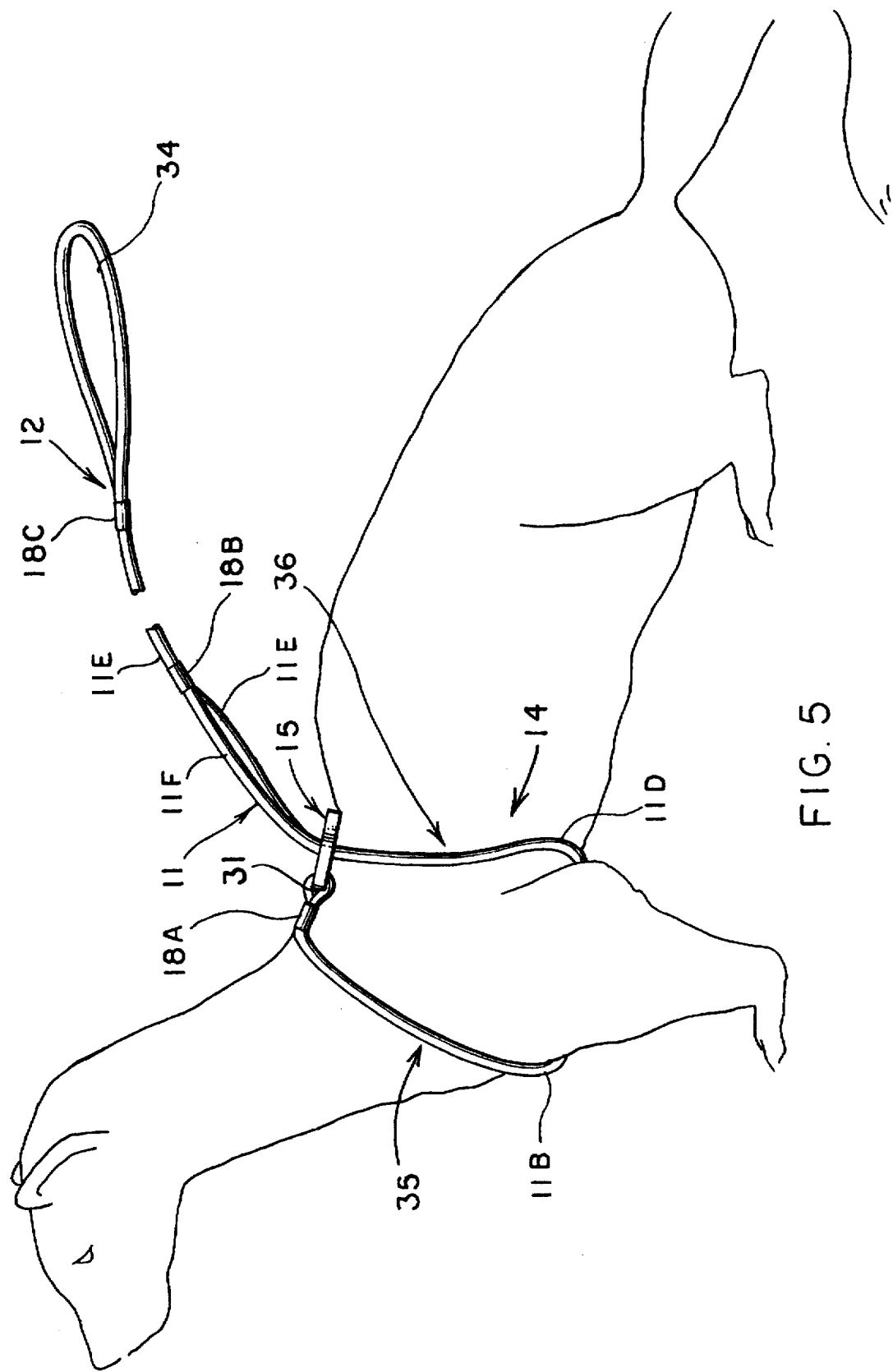
FIG. 5 is a perspective view of the combined harness and lead according to the invention fitted on a ferret.

Device 10 may be fitted on an animal as depicted in FIG. 5 by adjusting the size of loops 35 or 36 such that they may be readily passed over the animal's head. After both loops 35 and 36 have been placed over the animals head, body loop 36 may be manipulated relative to the animal's forelegs such that loop 36 is disposed around the animal's midsection just behind the forelegs. Device 10 should further be adjusted such that adjustment slide 15 is located on the animal's back substantially between the animal's shoulders and retaining slide 16 is located on the animal's breast substantially between the animal's forelegs. Adjustment of device 10 is primarily accomplished by moving adjustment slide 15 so that loops 35 and 36 are fitted snugly around the animal's neck and midsection respectively. This is facilitated by actuating slide 15 so that apertures 30 are concentrically aligned, thereby allowing cord 11 freely to pass therethrough. When device 10 has been snugly secured, adjustment slide 15 may be allowed to return to the unactuated state wherein cord 11 is clampingly engaged in apertures 30 as shown in FIG. 2. A bias pressure is produced as a result of the resilient plastic adjustment slide tending to return to its original shape after being compressed. This bias pressure tends to force apertures 30 out of alignment thereby to frictionally engaging cord 11 so as to prevent slipping of slide 15 during use. Thus, it can be seen that the combined harness and lead according to the invention serves to securely restrain small animals while being simple and safe to use.

The above-described device thus accomplishes the objects of the present invention and otherwise improves the art.

I claim:

1. An animal restraint and control device comprising harness means adapted to fit on the body of an animal, said harness means including a cord member defining a neck loop adapted to be fitted around the animal's neck and a body loop adapted to be fitted around the animal's midsection, lead means combined with said harness means for controlling and restraining the animal, and adjustment means associated with said harness means for quickly and securely adjusting said harness means around the animal's body, said adjustment means including a floating retaining slide between said neck loop and said body loop, and an adjustment slide engaging said cord member between said neck loop and said body loop, said adjustment slide including means for receiving said cord member which has means for selectively clamping said cord member therein, a portion of said cord member being disposed on the opposite side of said adjustment slide from said body loop, said lead means being formed by said portion.

2. An animal restraint and control device according to claim 1, wherein said lead means includes a hand loop therein.

3. An animal restraint and control device according to claim 1, wherein the size of said neck loop and said body loop may be selectively adjusted by moving said cord member relative to said adjustment slide.

4. An animal restraint and control device comprising harness means adapted to fit on the body of an animal, said harness means including a cord member defining a neck loop adapted to be fitted around the animal's neck and a body loop adapted to be fitted around the animal's midsection, lead means combined with said harness means for controlling and restraining the animal, and adjustment means associated with said harness means for quickly and securely adjusting said harness means around the animal's body, said adjustment means including an adjustment slide engaging said cord member between said neck loop and said body loop, said adjustment slide including means for receiving said cord member, said means for receiving having means for selectively clamping said cord member therein, said means for receiving said cord member including a pair of opposed mating protrusions each having an aperture therein, and means for biasing said protrusions away from one another such that said apertures may be concentrically aligned when a force is exerted on said adjustment slide sufficient to overcome said means for biasing.

5. An animal restraint and control device according to claim 4, wherein said cord member passes through said apertures and is selectively clampingly engaged therein.

6. An improved animal restraint and control device having a harness portion combined with a lead portion, the improvement comprising a cord member defining the harness portion and the lead portion, said cord member forming a neck loop and a body loop in the harness portion, a floating retaining slide between said neck loop and said body loop, and an adjustment slide located at the junction of the harness portion and the lead portion for quickly adjusting and securely maintaining the harness portion on the animal's body, a portion of said cord member being disposed on the opposite side of said adjustment slide from said body loop, said lead portion being formed by said portion of said cord member.

7. An improved animal restraint and control device according to claim 6, wherein the lead portion includes a hand loop therein.

8. An improved animal restraint and control device according to claim 6, wherein said adjustment slide includes means for receiving said cord member, said means for receiving having means for selectively clamping said cord member therein.

9. An improved animal restraint and control device according to claim 8, wherein the size of said neck loop and said body loop may be selectively adjusted by moving said cord member relative to said adjustment slide.

10. An improved animal restraint and control device having a harness portion combined with a lead portion, the improvement comprising a cord member defining the harness portion and the lead portion, said cord member forming a neck loop and a body loop in the harness portion, and an adjustment slide located at the junction of the harness portion and the lead portion for quickly adjusting and securely maintaining the harness portion on the animal's body, wherein said adjustment slide includes means for receiving said cord member which includes a pair of opposed mating protrusions each having an aperture therein, and means for biasing said protrusions away from one another such that said apertures may be concentrically aligned when a force is exerted on said adjustment slide sufficient to overcome said means for biasing.

11. An improved animal restraint and control device according to claim 10, wherein said cord member passes through said apertures and is selectively clampingly engaged therein.

12. A combined harness and lead for controlling and restraining an animal comprising a cord member defining a harness portion and a lead portion, said harness portion having a neck loop and a body loop, said lead portion having a hand loop, an adjustment slide engaging said cord member between said neck loop and said body loop, said adjustment slide including means for receiving said cord member, said means for receiving having means for selectively clamping said cord member therein, said means for selectively clamping said cord member including a pair of opposed mating protrusions each having an aperture therein, and means for biasing said protrusions away from one another such that said apertures may be concentrically aligned when a force is exerted on said adjustment slide sufficient to overcome said means for biasing, said cord member passing through said apertures and being selectively clampingly engaged therein, the size of said neck loop and said body loop being selectively adjustable by moving said cord member relative to said adjustment slide, said harness portion further including a retaining slide between said neck loop and said body loop.

13. A combined harness and lead according to claim 12, wherein the lead portion is formed by the portion of said cord member disposed on the opposite side of said adjustment slide from said body loop.

* * * * *